(12) United States Patent
Rachamadugu

(10) Patent No.: US 10,938,619 B2
(45) Date of Patent: Mar. 2, 2021

(54) ALLOCATION OF VIRTUAL INTERFACES TO CONTAINERS

(71) Applicant: ColorTokens, Inc., Santa Clara, CA (US)

(72) Inventor: Raghavendra Rachamadugu, Santa Clara, CA (US)

(73) Assignee: COLORTOKENS, INC., Santa Clara, CA (US)

( * ) Notice: Subject to any disclaimer, the term of this patent is extended or adjusted under 35 U.S.C. 154(b) by 253 days.

(21) Appl. No.: 15/689,438

(22) Filed: Aug. 29, 2017

(65) Prior Publication Data

US 2018/0062908 A1 Mar. 1, 2018

Related U.S. Application Data

(60) Provisional application No. 62/381,278, filed on Aug. 30, 2016.

(51) Int. Cl.
*H04L 29/06* (2006.01)
*G06F 9/48* (2006.01)
*G06F 9/455* (2018.01)
*H04L 12/46* (2006.01)

(52) U.S. Cl.
CPC ........ *H04L 29/06612* (2013.01); *G06F 9/455* (2013.01); *G06F 9/4856* (2013.01); *H04L 12/4641* (2013.01); *H04L 63/0272* (2013.01); *G06F 2009/45595* (2013.01); *H04L 63/08* (2013.01); *H04L 63/0876* (2013.01)

(58) Field of Classification Search
None
See application file for complete search history.

(56) References Cited

U.S. PATENT DOCUMENTS

| | | | | |
|---|---|---|---|---|
| 8,549,187 B1 * | 10/2013 | Christopher | .......... | H04L 61/103 709/220 |
| 8,627,069 B2 * | 1/2014 | Clermont | ................ | G06F 21/53 713/164 |
| 8,713,658 B1 * | 4/2014 | Tidd | .................... | H04L 63/0815 713/155 |
| 9,027,087 B2 * | 5/2015 | Ishaya | .................... | H04L 63/08 726/4 |
| 9,189,609 B1 * | 11/2015 | Antony | ............... | G06F 9/45558 |
| 9,628,328 B2 * | 4/2017 | Dietz | .................. | H04L 41/0806 |
| 9,634,948 B2 * | 4/2017 | Brown | .................. | H04L 47/323 |
| 9,716,688 B1 * | 7/2017 | Emelyanov | ......... | H04L 65/4076 |
| 10,367,802 B2 * | 7/2019 | Koushik | ............. | H04L 63/0807 |
| 10,389,598 B2 * | 8/2019 | Padala | .................. | G06F 9/5077 |

(Continued)

*Primary Examiner* — Saleh Najjar
*Assistant Examiner* — Michael W Chao
(74) *Attorney, Agent, or Firm* — Barry Choobin; Patent 360 LLC

(57) ABSTRACT

Systems, methods, and software described herein enhance connectivity between computing systems and containers. In one implementation, a method of allocating virtual network interfaces to containers on a host includes transferring, from the host, a request to at least one configuration resource to obtain an address configuration for one or more containers to be executed on the host. The method further provides for receiving an addressing configuration for the one or more containers to be executed on the host, and assigning a virtual network interface to each of the one or more containers based on the addressing configuration.

13 Claims, 9 Drawing Sheets

(56) References Cited

U.S. PATENT DOCUMENTS

| | | | |
|---|---|---|---|
| 10,567,271 B2* | 2/2020 | van Bemmel | H04L 61/6004 |
| 2008/0019359 A1* | 1/2008 | Droux | H04L 12/4641 |
| | | | 370/389 |
| 2008/0043756 A1* | 2/2008 | Droux | H04L 12/66 |
| | | | 370/399 |
| 2008/0151893 A1* | 6/2008 | Nordmark | H04L 45/60 |
| | | | 370/392 |
| 2013/0268588 A1* | 10/2013 | Chang | H04L 67/10 |
| | | | 709/204 |
| 2013/0268643 A1* | 10/2013 | Chang | G06F 9/45558 |
| | | | 709/223 |
| 2013/0275990 A1* | 10/2013 | Koutyrine | G06F 8/51 |
| | | | 718/104 |
| 2013/0346583 A1* | 12/2013 | Low | H04L 12/4641 |
| | | | 709/223 |
| 2015/0052522 A1* | 2/2015 | Chanda | G06F 9/455 |
| | | | 718/1 |
| 2015/0113112 A1* | 4/2015 | Nan | H04L 41/0659 |
| | | | 709/223 |
| 2015/0229629 A1* | 8/2015 | Ishaya | H04L 63/08 |
| | | | 726/4 |
| 2015/0317169 A1* | 11/2015 | Sinha | H04L 49/254 |
| | | | 713/2 |
| 2016/0105471 A1* | 4/2016 | Nunes | H04L 12/4633 |
| | | | 709/228 |
| 2016/0212012 A1* | 7/2016 | Young | H04L 41/14 |
| 2016/0378518 A1* | 12/2016 | Antony | G06F 9/4856 |
| | | | 718/1 |
| 2017/0005987 A1* | 1/2017 | Masurekar | H04L 63/20 |
| 2017/0017515 A1* | 1/2017 | Khatri | G06F 9/45558 |
| 2017/0104674 A1* | 4/2017 | Liljenstolpe | H04L 45/586 |
| 2017/0111236 A1* | 4/2017 | Bielenberg | H04L 41/22 |
| 2017/0170990 A1* | 6/2017 | Gaddehosur | H04L 67/1031 |
| 2017/0272400 A1* | 9/2017 | Bansal | H04L 61/1582 |
| 2018/0007008 A1* | 1/2018 | Bansal | H04L 63/0263 |
| 2018/0063103 A1* | 3/2018 | Jahid | H04L 63/0807 |
| 2018/0375687 A1* | 12/2018 | Gaddehosur | H04L 12/4675 |
| 2019/0158537 A1* | 5/2019 | Miriyala | G06F 9/5077 |
| 2019/0258505 A1* | 8/2019 | Gao | G06F 9/45558 |
| 2019/0273625 A1* | 9/2019 | Tessmer | H04L 12/18 |
| 2019/0386919 A1* | 12/2019 | Li | H04L 12/4641 |

* cited by examiner

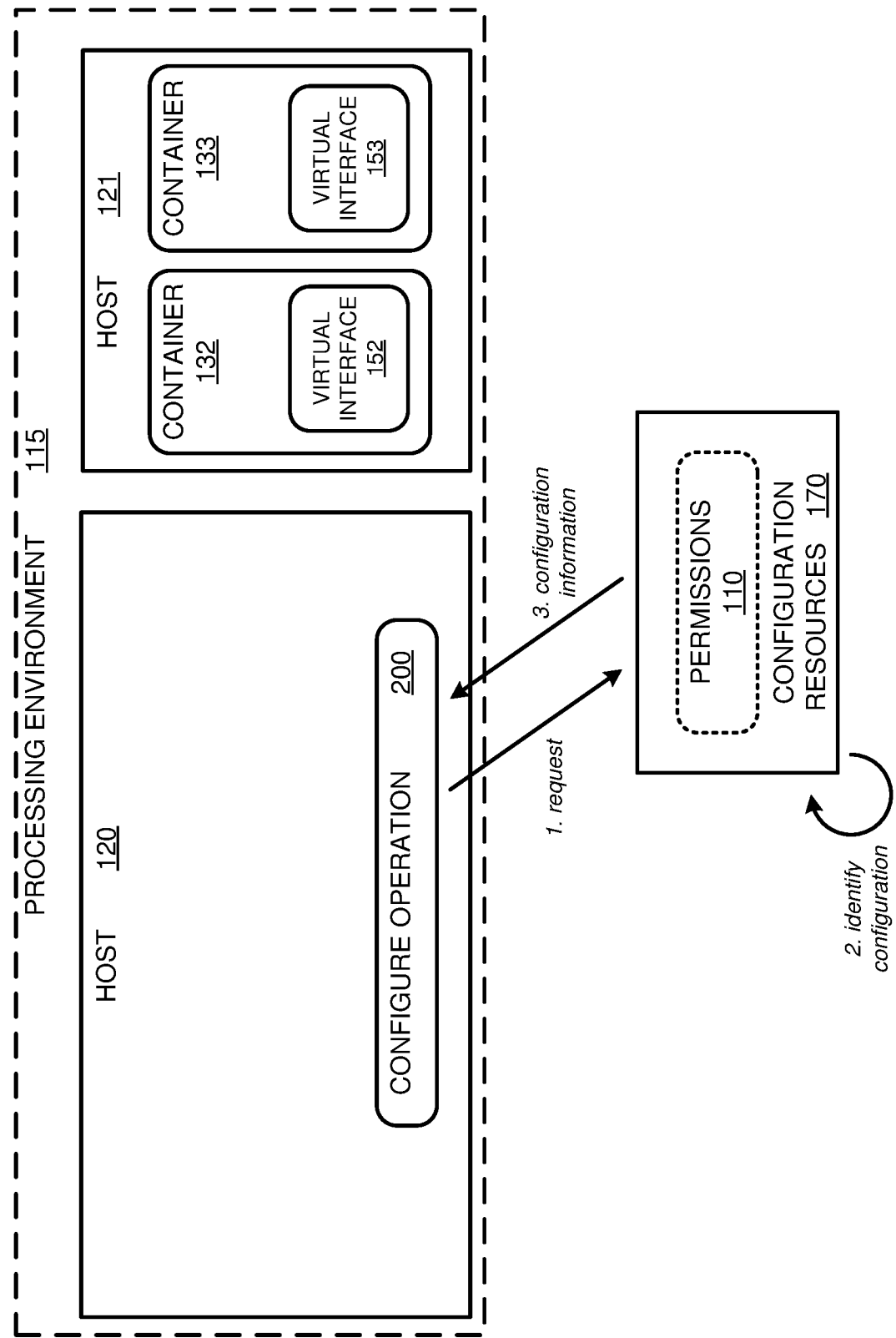

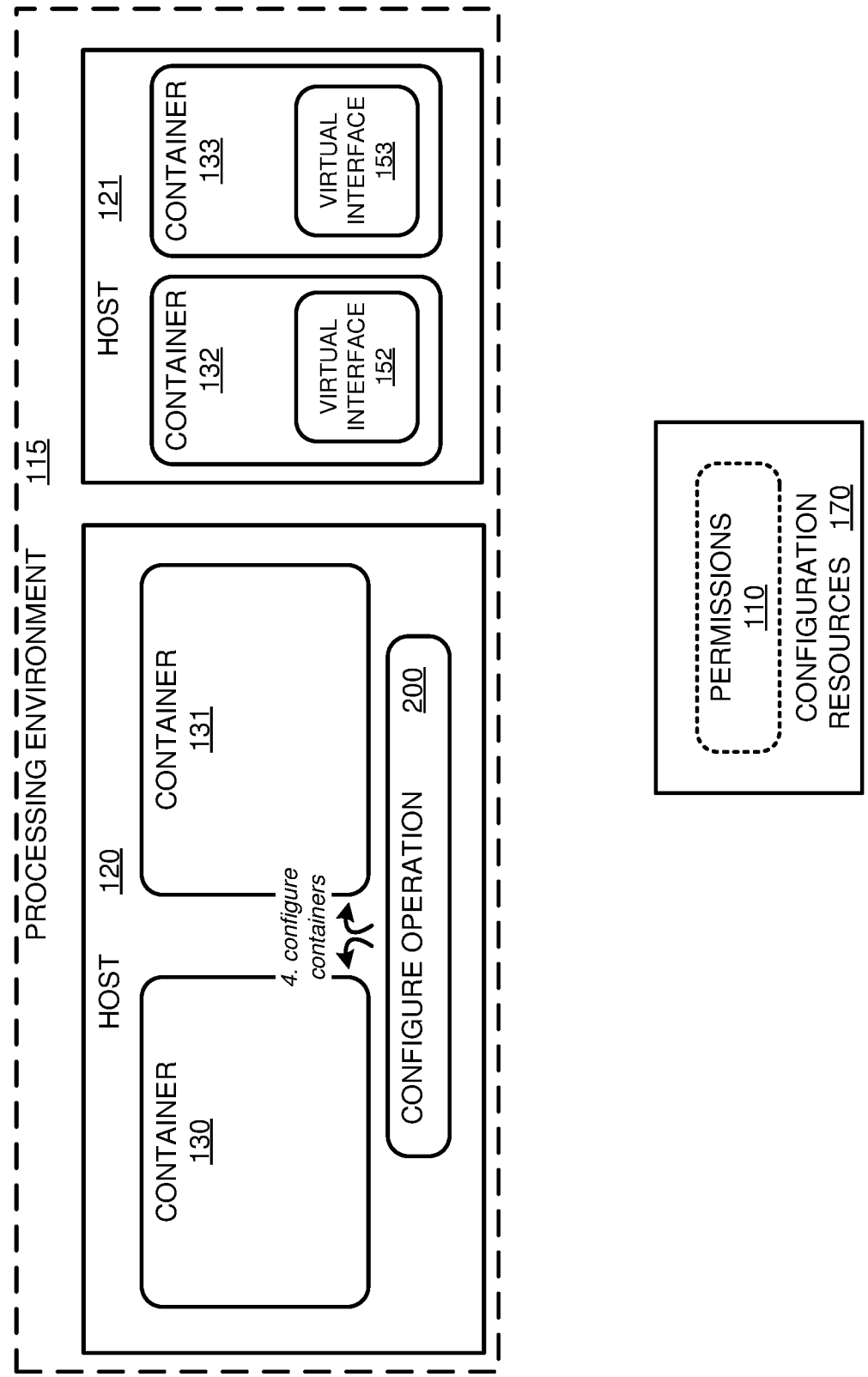

US 10,938,619 B2

ALLOCATION OF VIRTUAL INTERFACES TO CONTAINERS

RELATED APPLICATIONS

This application claims the benefit of, and priority to, U.S. Provisional Patent Application No. 62/381,278, entitled "ALLOCATION OF VIRTUAL INTERFACES TO CONTAINERS", filed Aug. 30, 2016, and which is hereby incorporated by reference in its entirety for all purposes.

TECHNICAL FIELD

Aspects of the disclosure are related to computing hardware and software technology, and in particular to computer architecture, cloud computing, and virtualization technology.

TECHNICAL BACKGROUND

In many organizations, computing systems or devices are configured with computing resources based on tasks and/or requirements of the particular computing system. These resources may include storage resources, virtual machine resources, processing resources, applications, or any other similar type of computing resource. To provide the computing resources, an organization may employ information technology (IT) personnel that manage and configure the various computing systems for each desired function. This configuring of computing systems may include installing software and applications on the devices, installing hardware on the devices, and providing security mechanisms, such as firewalls and antivirus software, to ensure security on the organizations network.

In some implementations, in configuring a computing system, containers may be instantiated on the computing system to provide a particular operation. These containers may provide web server operations, large-scale data processing operations, email server operations, or any other similar operation. However, configuring each of the containers on each of the host systems can be difficult and cumbersome as the number of computing systems of an organization increases. Moreover, each of the containers initiated may require specific communication and security attributes, which can compound the difficulty of configuring each of the containers for their desired purpose.

OVERVIEW

The technology disclosed herein provides enhancements for allocating secure network configurations to containers on host systems. In one implementation, a method of allocating virtual network interfaces to containers on a host includes transferring, from the host, a request to at least one configuration resource to obtain an address configuration for one or more containers to be executed on the host. The method further provides for receiving an addressing configuration for the one or more containers to be executed on the host, and assigning a virtual network interface to each of the one or more containers based on the addressing configuration.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIGS. 4A-4C illustrate an operational scenario of configuring containers and allocating virtual communication interfaces according to one implementation.

TECHNICAL DISCLOSURE

Containers, such Docker containers, Linux containers, jails, or other similar types of virtual containment nodes, provide an efficient method of using resource of a host system to provide desired operations. In particular, resources used by the containers may include kernel resources from the host computing system or virtual machine, and may further include repositories and other approved resources that can be shared with other containers or processes executing on the hosts. However, although resources may be shared between the containers on a host, the containers are provisioned to have private access to the operating system with their own identifier space, file system structure, and network interfaces. Accordingly, while multiple containers may be operating on a host system at any one time, the containers may be treated as individual computing nodes in a computing network.

In the present example, in configuring containers for a host computing system, the host computing system is configured to communicate with one or more configuration resources to receive an addressing configuration for one or more containers to be initiated on the host. To retrieve the addressing configuration, credentials may be supplied to the configuration resources, wherein the credentials are used to verify the ability of the host to retrieve and addressing configuration. Once a host is approved, an addressing configuration may be supplied to the requesting host, permitting the host to assign virtual network interfaces to each of the one or more containers based on the addressing configuration.

In some implementations, the addressing configuration may be used to associate specific containers with specific virtual private networks (VPNs). For example, if a first container on a host is used as a database system for one or more other virtual nodes and physical computing systems, a virtual network interface may be assigned to the container that is configured for that particular network. Consequently, although other containers may be executing on the same host, the virtual private network supplied by the virtual network interface may prevent the other containers from identifying communications by the first container assigned to the virtual private network.

Figure 1:
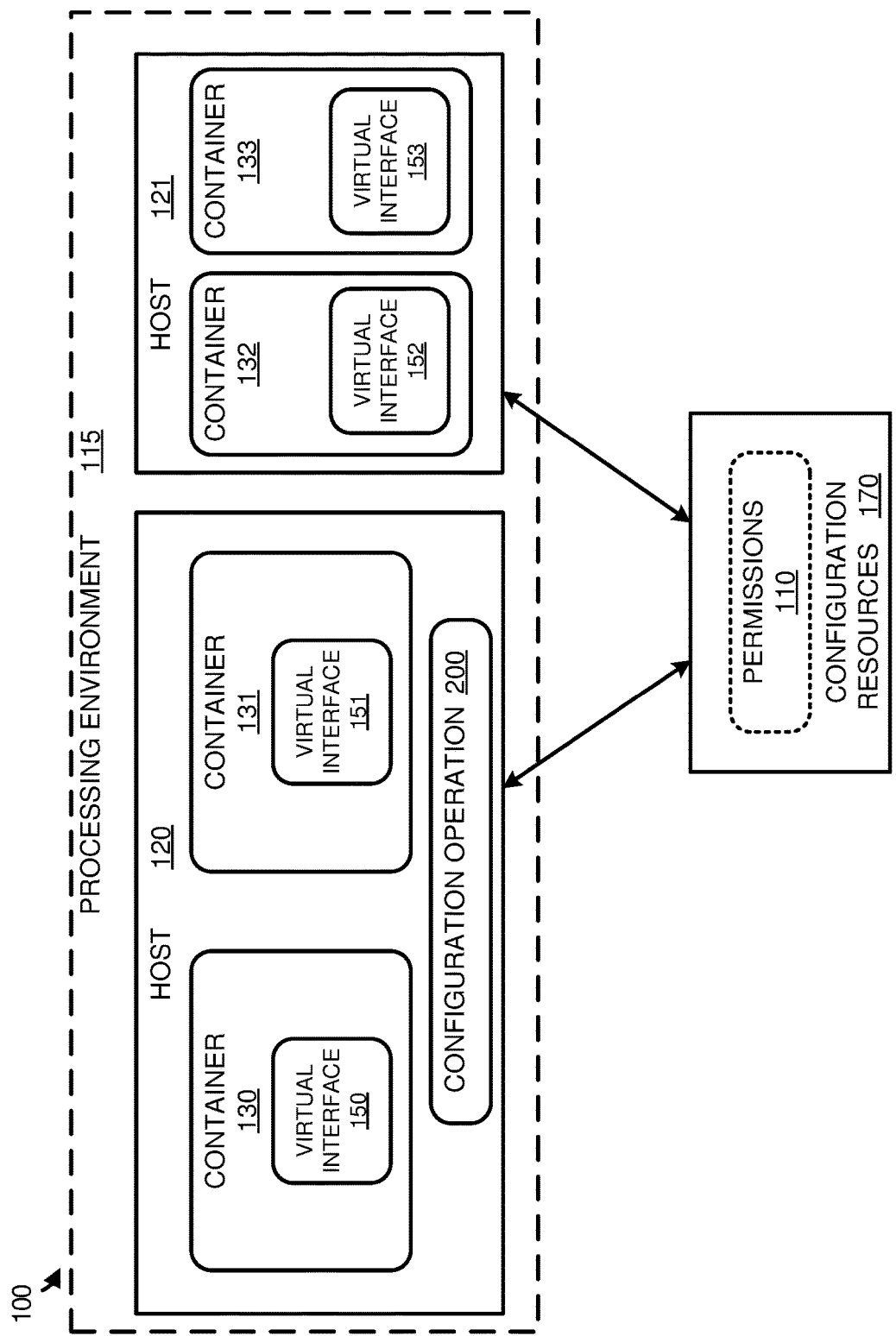
FIG. 1 illustrates a computing environment to allocate virtual communication interfaces to containers according to one implementation.

Referring to FIG. 1, FIG. 1 illustrates a computing environment 100 to allocate virtual communication interfaces to containers according to one implementation. Computing environment 100 includes processing environment 115 with hosts 120-121, and further includes configuration resources 170 with permissions 110. Hosts 120-121 include containers 130-133 and virtual interfaces 150-153. Host 120 further includes configure operation 200, which is further described in FIG. 2. Hosts 120-121 are host computing systems capable of hosting containers 130-133, wherein the containers may include Docker containers, Linux containers, jails, or other similar types of virtual containment nodes.

Hosts 120-121 can include communication interfaces, network interfaces, processing systems, computer systems, microprocessors, storage systems, storage media, or some other processing devices or software systems. Examples of hosts 120-121 can include software such as an operating system, logs, databases, utilities, drivers, natural language processing software, networking software, and other software stored on a computer-readable medium. Hosts 120-121 may comprise, in some examples, server computing systems, desktop computing systems, laptop computing systems, or any other computing system, including combinations thereof.

Configuration resources 170 can each include communication interfaces, network interfaces, processing systems, computer systems, microprocessors, storage systems, storage media, or some other processing devices or software systems, and can be distributed among multiple devices. Examples of configuration resources 170 can include software such as an operating system, logs, databases, utilities, drivers, networking software, and other software stored on a computer-readable medium. Configuration resources 130-132 may each comprise, in some examples, one or more server computing systems, desktop computing systems, laptop computing systems, or any other computing system, including combinations thereof.

Figure 2:
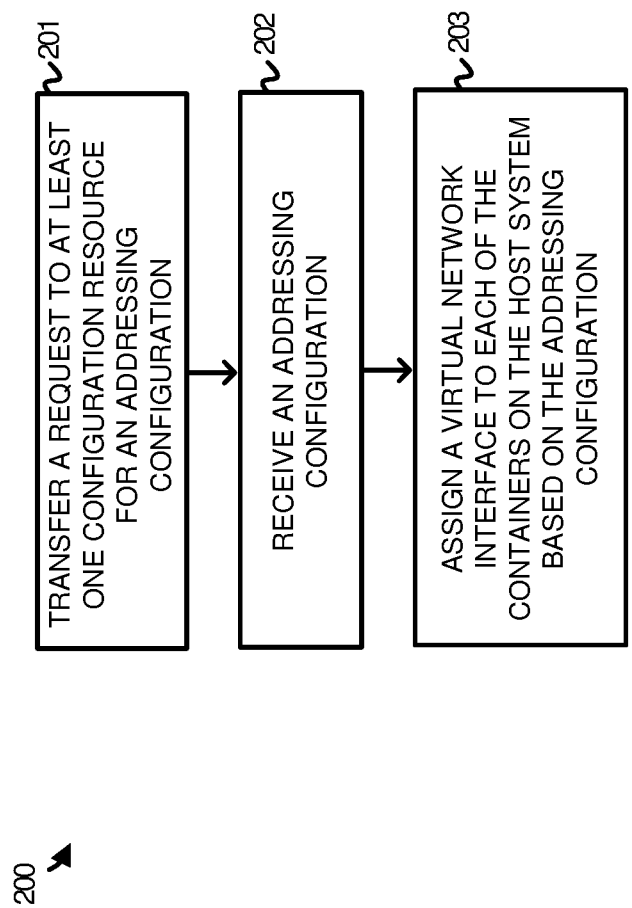
FIG. 2 illustrates a configuration operation to allocate virtual communication interfaces to containers according to one implementation.

To further demonstrate the operation of computing environment 100 FIG. 1, FIG. 2 is provided. FIG. 2 illustrates configuration operation 200 to allocate virtual communication interfaces to containers according to one implementation. The processes of operation 200 are referenced parenthetically in the paragraphs that follow, along with references to the elements and systems from computing environment 100 of FIG. 1.

As depicted in FIG. 1 hosts 120-121 are each capable of communicating with configuration resources 170 to obtain an addressing configuration for containers operating thereon. In particular, for host 120, configuration operation 200 transfers (201) a request to at least one configuration resource for an addressing configuration. In some implementations, this request may include credentials such as a key, passcode, or any other similar credential to access the required configuration resource. These credentials may be pre-loaded into host 120, may be obtained from an authentication server, or retrieved in any other similar manner. In at least one example, host 120 may identify user identifier information and/or host identifier information, and provide the information to an authentication server. The authentication server may use the supplied identifier information to identify one or more configuration resources associated with the user and/or the host, and provide the required access credentials to the host for the one or more configuration resources. These access credentials may include addressing information for the configuration resources, encryption information for the configuration resources, or any other similar access credentials for the configuration resources.

Once the credentials are supplied to the at least one configuration resource, the configuration resource may verify the credentials using permissions 110, and provide an addressing configuration to host 120. Host 120, receives (202) the addressing configuration, and assigns (203) a virtual network interface to each of the containers on the host system based on the addressing configuration. In some examples, host 120 may be preconfigured with containers that have not been allocated a virtual network interface. Thus, to configure the containers for operation, the host may be required to communicate with at least one configuration resource to retrieve the required addressing configuration for the containers. In other implementations, in addition to retrieving the addressing configuration, the host may also retrieve an image for the containers, wherein the image may include the required software files and directories to implement a particular operation. For example, the image for the container may include an image to make the container into a database node, a web server, an email server, or some other similar service node. Once the image is implemented, the addressing configuration may be applied to the node to allocate the virtual network interfaces.

In some implementations, in allocating the virtual network interfaces 150-151, host 120 may provide each of the nodes with a virtual network interface configured for a specific virtual private network (VPN). For example, container 130 may be allocated with virtual network interface 150 to communicate with a first set of physical devices and virtual nodes, while container 131 may be provided with virtual network interface 151 to communicate with a second set of physical devices and virtual nodes. This would permit different organizations or different divisions within an organization to securely allocate addressing configurations to each of the required containers, wherein the containers could be confined to the particular VPN.

In some examples, in allocating the virtual network interfaces to each of containers 130-131, host 120 may assign a TAP interface to each of the containers based on the configuration provided from configuration resources 170. This TAP interface simulates a link layer device and operates with Open Systems Interconnection (OSI) level 2 packets like Ethernet frames, which permits an Ethernet type bridge to be allocated to each of the containers. Accordingly, a software version of an Ethernet bridge may be provided to each of the containers, wherein the Ethernet bridge is configured to communicate with other systems and nodes on the same virtual private network.

Figure 3:
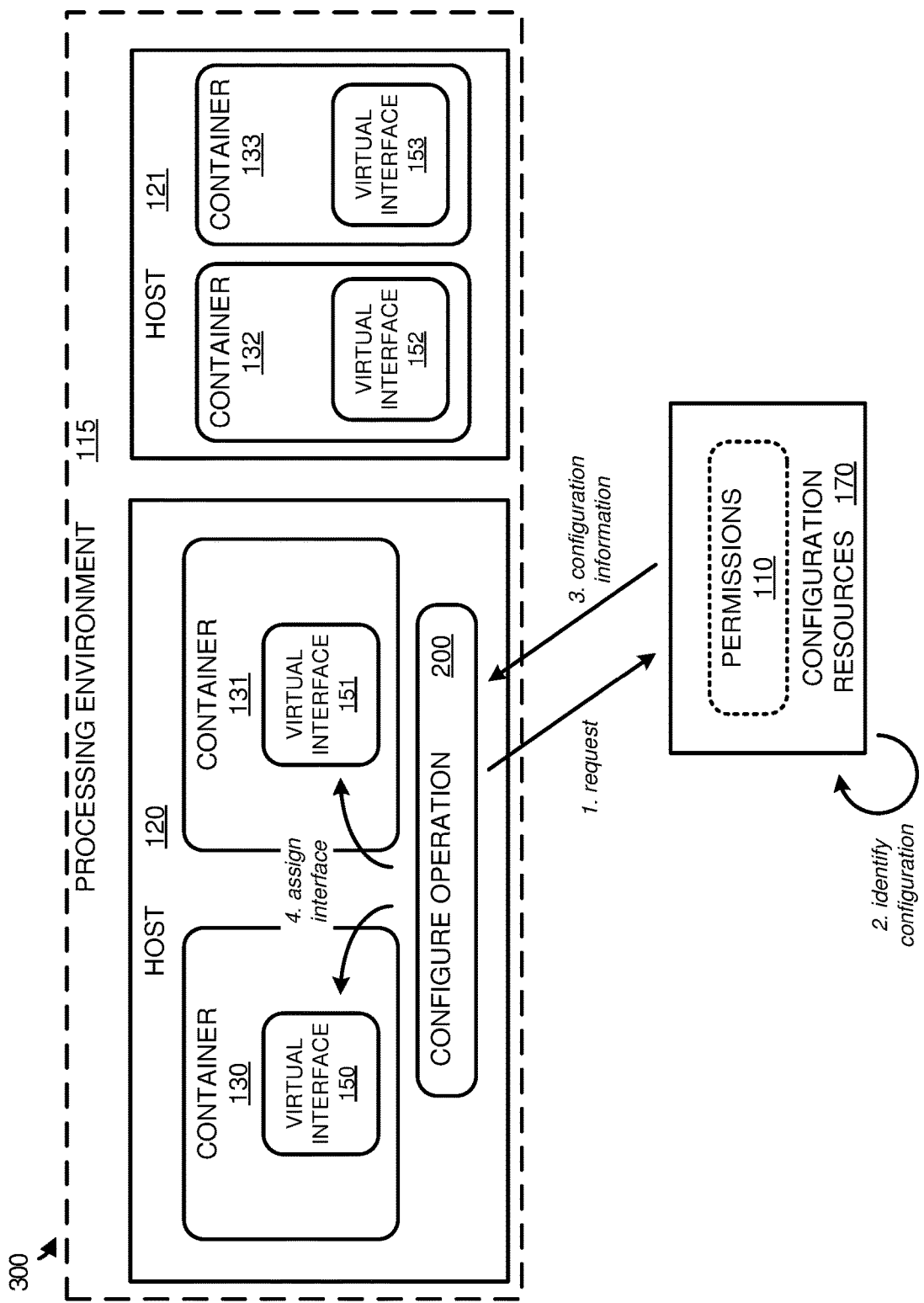
FIG. 3 illustrates an operational scenario of allocating virtual communication interfaces to containers according to one implementation.

FIG. 3 illustrates an operational scenario 300 of allocating virtual communication interfaces to containers according to one implementation. Operational scenario 300 includes systems and elements from computing environment 100 of FIG. 1.

As depicted, operational scenario 300 begins, at step 1, by transferring a request from host 120 to one or more resources in configuration resources to retrieve an addressing configuration for containers 130-131. In some implementations, containers 130-131 may comprise containers that host 120 already has an image. In other implementations, host 120 may also be configured to retrieve a configuration for the containers, wherein the configuration includes and image for the containers to be deployed on the host.

In response to the request, configuration resources 170 identify, at step 2, a configuration available to be provided to host 120. In some examples, the request provided by host 120 may include credentials associated with host 120. These credentials may include passcodes or keys that are used to access specific resources in configuration resources. Accordingly, if proper credentials are provided to a particular resource or resources in configuration resources 170, the configuration resources may identify the required addressing configuration, and provided, at step 3, the addressing configuration to host 120.

Once the address configuration is received by host 120, configuration operation 200 directs host 120 to assign, at step 4, virtual network interfaces to containers 130-131. In some implementations, the addressing configuration provided by configuration resources 170 may include VPN information for each of containers 130-131. This VPN information defines the network and relevant devices, both real and virtual, that should be in communication with each of the containers. For example, container 130 may comprise a database server application container that should only be accessible to financial officers of an organization, while container 131 may comprise a database server that should only be accessible to marketing personnel of the same organization. Accordingly, virtual interfaces 150-151 may each be configured to communicate on separate virtual networks that are associated with the required group or real and virtual systems.

In at least one implementation, to define the credentials that are provided by the host to configuration resources 170, host 120 may communicate with an authentication server that is used to determine which of the configuration resources should be made available to the host. In particular, host 120 may provide user identifier information, such as username and password information, and/or device identifier information, such as a serial number or media access control (MAC) address associated with the host to the authentication server. In response to receiving the information from host 120, the authentication server may determine which of the configuration resources should be made available to the host, or if any resources should be made available to the host. Once the resources are identified, the authentication server may provide access credentials to the host permitting the host to communicate with the required configuration resources. These access credentials may include addressing information for the one or more configuration resources, encryption keys, access codes, or any other similar required information to access configuration resources 170.

Figure 4C:
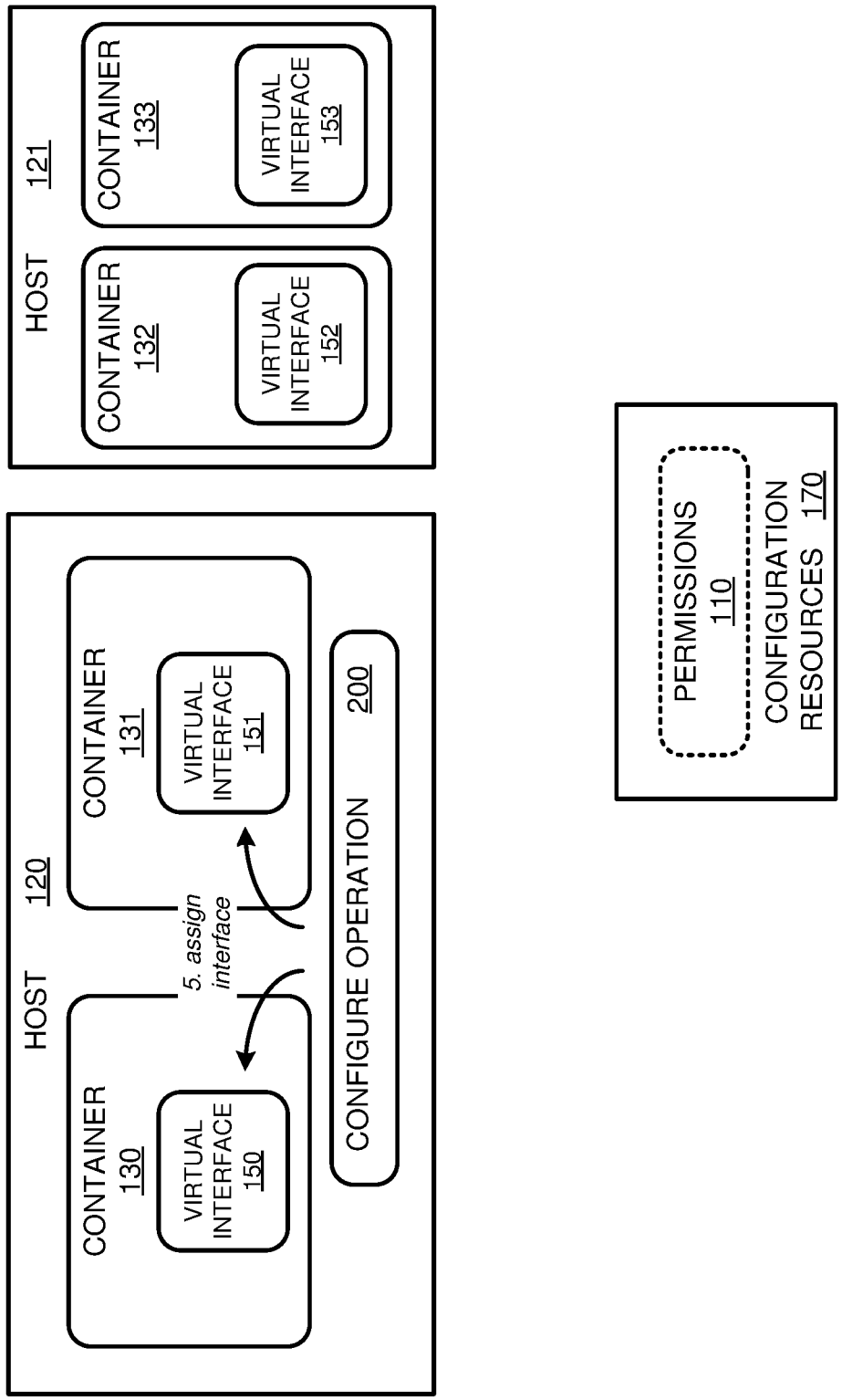

FIGS. 4A-4C illustrate an operational scenario of configuration containers and allocating virtual communication interfaces according to one implementation. FIGS. 4A-4C include systems and elements from computing environment 100 of FIG. 1.

Referring first to FIG. 4A, configuration operation 200 on host 120 transfers, at step 1, a request to one or more resources in configuration resources 170. In response to the request, the configuration resources identify, at step 2, the required configuration and provide, at step 3, the configuration information to host 120 and configuration operation 200. In some implementations, in communicating with configuration resources 170, host 120 may require access credentials, such as the appropriate addressing for associated configuration resources, encryption information for associated configuration resources, passkey or code information or any other similar information. Accordingly, when a request is transferred to a configuration resource, the resource may process the access credentials to determine if the host is capable of receiving the requested configuration. If the access credentials indicate that the host is to receive a configuration, then the appropriate configuration will be returned to the requesting host. Here, the configuration provided by configuration resources 170 includes at least container images to be executed on host 120, as well as an addressing configuration for the container images.

In at least one implementation, to define the access credentials that are provided by the host to configuration resources 170, host 120 may communicate with an authentication server that is used to determine which of the configuration resources should be made available to the host. In particular, host 120 may provide user identifier information, such as username and password information for a user of host 120, and/or device identifier information, such as a serial number or media access control (MAC) address associated with the device to the authentication server. In response to receiving the information from host 120, the authentication server may determine which of the configuration resources should be made available to the host, or if any resources should be made available to the host. Once the resources are identified, the authentication server may provide access credentials to the host permitting the host to communicate with the required configuration resources. These access credentials may include addressing information for the one or more configuration resources, encryption keys, access codes, or any other similar required information to access configuration resources 170.

Referring now to FIG. 4B, once the configuration is received by configuration operation 200 on host 120, configuration operation 200 uses the configuration to implement the desired operations on host 120. In the present example, the configuration provided by configuration resources 170 include images to implement containers 130-131. These images may include files and repositories (sometimes in compressed form) for the containers to be executed on the host, such that the containers may share at least kernel resources provided by an operating system for host 120. Accordingly, based on the images provided from configuration resources 170, configuration operation 170 may configure, at step 4, the containers in accordance with the provided images.

Turning to FIG. 4C, in addition to configuring the containers based on images, the configuration information from configuration resources 170 further include addressing configurations for each of the containers. This addressing configuration permits each of the containers to join at least one VPN required for the container. For example, container 130 may comprise an email server application. As a result, the addressing configuration for the container may be allocated such that other devices (either real or virtual) associated with a specific VPN may access the container for the email server application.

In the present implementation, to configure each of the containers for networking, each of the containers is assigned, at step 5, a virtual network interface based on the addressing configuration. This assignment of a virtual network interface may include a TAP interface assignment to each of the containers based on the configuration provided from configuration resources 170. This TAP interface simulates a link layer device and operates with OSI level 2 packets, such as Ethernet frames, which permits an Ethernet type bridge to be allocated to each of the containers. Accordingly, a software version of an Ethernet bridge may be provided to each of the containers, wherein the Ethernet bridge is configured to communicate with other systems and nodes on the same virtual private network. This may provide enhanced security as the only network interface provided to the container may be the network associated with the specific VPN.

Figure 5:
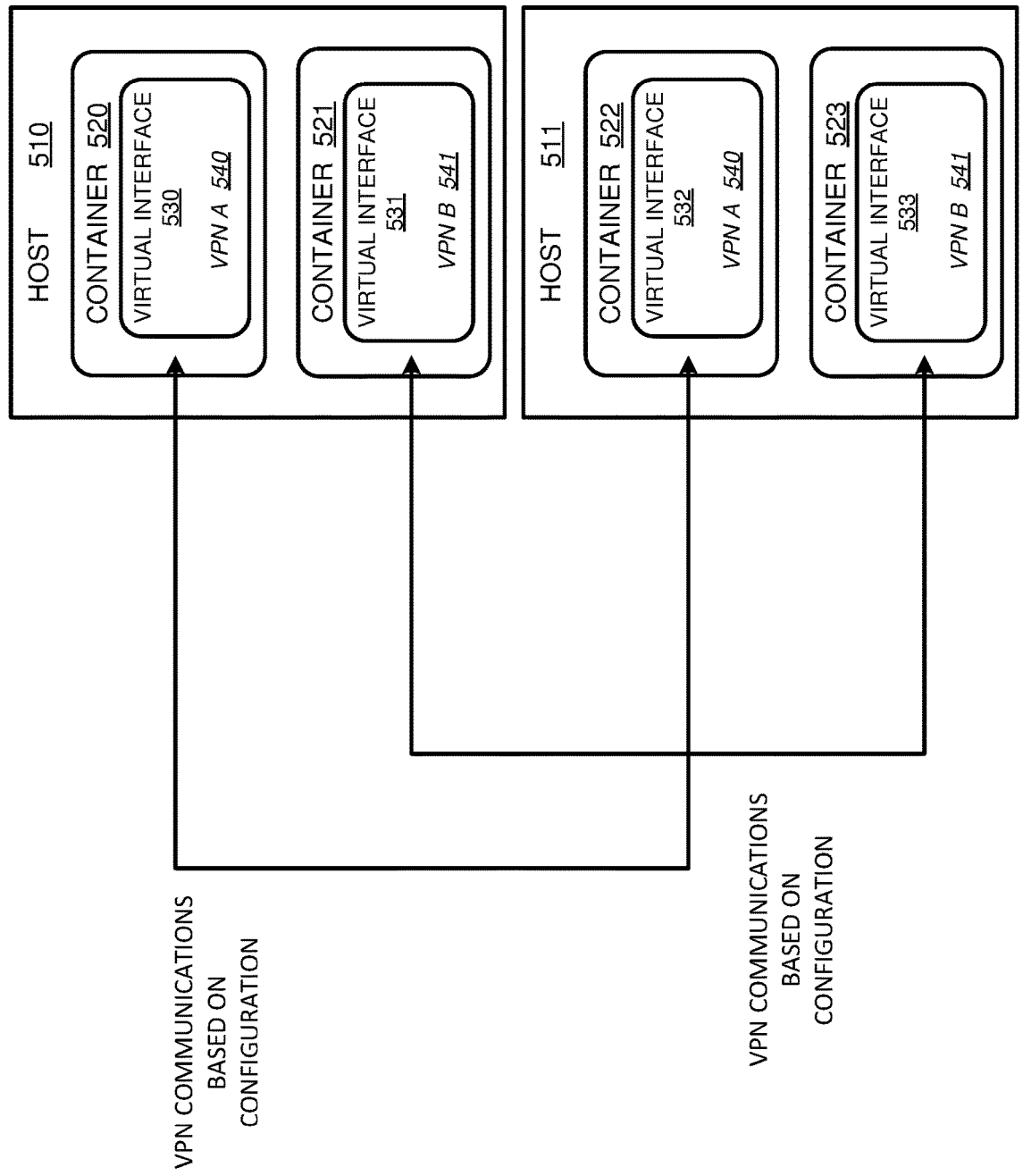
FIG. 5 illustrates network connectivity between configured containers according to one implementation.

FIG. 5 illustrates network connectivity between configured containers according to one implementation. FIG. 5 includes hosts 510-511 with containers 520-523. Containers 520-523 further includes virtual interfaces 530-533, which are each allocated one of VPN A 540, or VPN B 541.

As described herein, hosts 510 and 511 may communicate with one or more configuration resources to retrieve addressing configurations for containers to be executed on the hosts. These addressing configurations may be applied by each of the hosts to permit each of the containers to communicate over a VPN with one or more other desired devices. For example, a VPN may be created for a pool of organization physical and virtual devices, and the container may be added to the VPN to provide a service, such as a database service. Here, hosts 510-511 provide a platform for containers 520-523, wherein each of the containers has been allocated a different virtual network interface by the hosts, permitting the containers to communicate on their corresponding VPN. In particular, because containers 520 and 522 are configured with a virtual interface for VPN A 540, the containers may only be permitted to communicate with other devices that are also on VPN A. In contrast, containers 521 and 523 are configured with a virtual interface for VPN B 541, the containers may only be permitted to communicate with other devices that are also on VPN B. Thus, while not illustrated in the example of FIG. 5, other devices that also belong to VPN A or VPN B may also be able to communicate with appropriate containers. For example, if containers 520 and 522 corresponded to database containers for a VPN A 540, then other systems and devices (real and/or virtual) may access the containers so long as they are on the same virtual network.

Although being illustrated in the present example with one virtual network interface per container, it should be understood that, in some implementations, it may be desirable for a container to include multiple interfaces. Such may be helpful when a single container should be accessible by computing systems on different VPNs.

Figure 6:
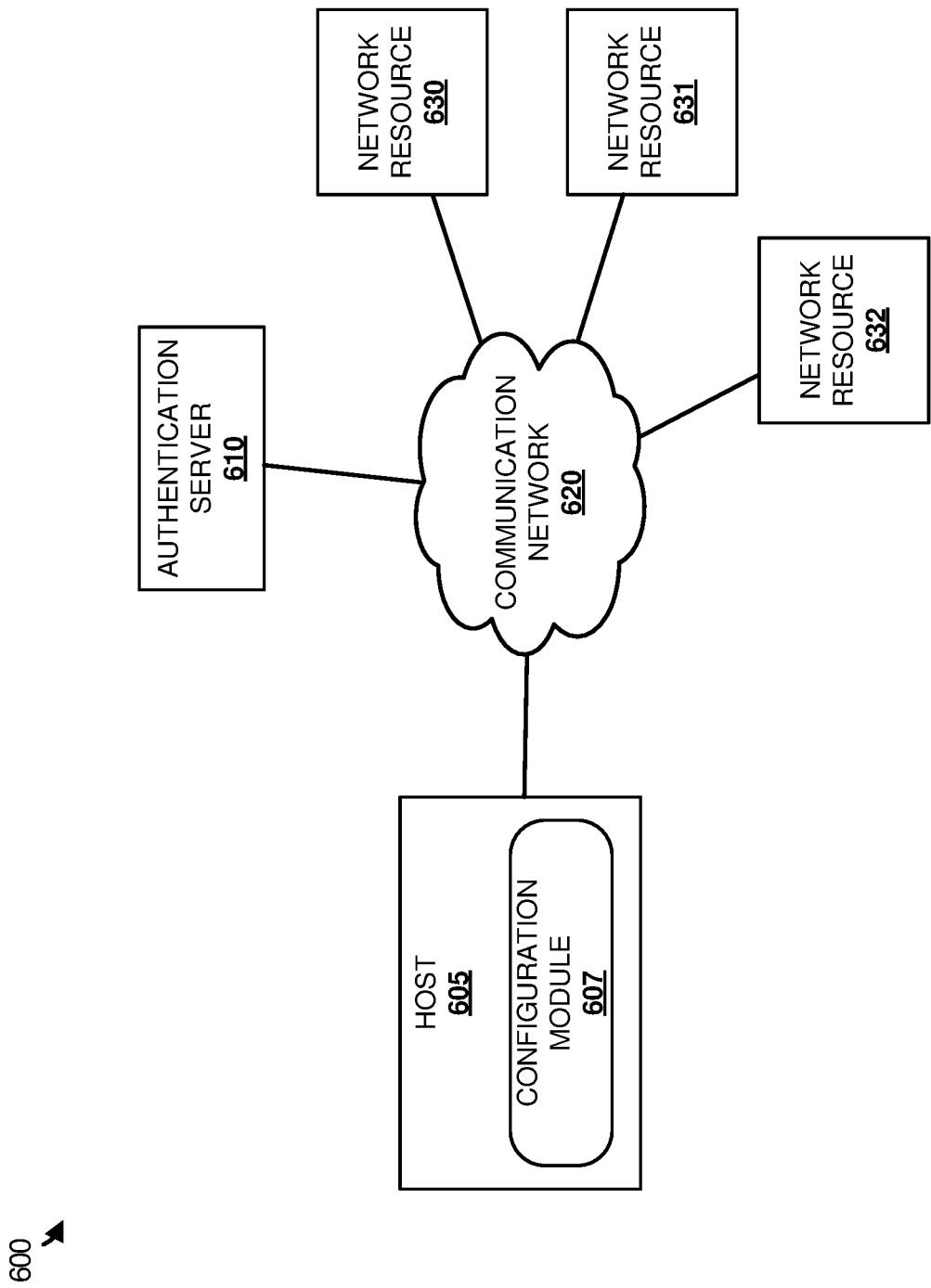
FIG. 6 illustrates a computing network to allocate virtual communication interfaces to containers according to one implementation.

FIG. 6 illustrates a computing network 600 to allocate virtual communication interfaces to containers according to one implementation. Computing network 600 includes host 605, authentication server 610, communication network 620, and network resources 630-632. Authentication server 610 and network resources 630-632 may each comprise a server computer, a desktop computer, or any other similar computing device capable of providing the operations described herein. Host 605, which may comprise a host server or any other host computing systems, communicates with authentication server 610 and network resources 630-632 using communication network 620.

In operation, host 605 executes configuration module 607 to retrieve a configuration for containers on host 605. In some implementations, the configuration may comprise a configuration for both the containers themselves, as well as an addressing configuration. However, in other implementations, the configuration may comprise an addressing configuration for images already available to host 605. To retrieve the required configuration, configuration module 607 identifies authentication information, which may include user identifier information and/or device identifier information, and provides the authentication information to authentication server 610. In some examples, the authentication information may be provided by an administrator or user via a user interface on host 605, however, in addition to or in place of the administrator defined authentication information, configuration module 607 may also identify information from the host system itself.

Once the authentication information is provided to authentication server 610, authentication server 610 processes the information to determine what access credentials should be supplied to the host. For example, a user with first authentication credentials may be provided with first access credentials, while a second user with second authentication credentials may be provided with second access credentials to a different network resources or resources.

After receiving the access credentials from authentication server 610, configuration module then communicates over communication network 620 to at least one network resource in network resources 630-632 based on the access credentials to retrieve the required configuration. For example, authentication server 610 may provide access credentials for network resource 630. As a result, host 605 may communicate with network resource 630 to retrieve the required configuration. This communication may include handshaking mechanisms, verification operations of host 605, or any other similar operation to ensure that host 605 is to receive the configuration from network resource 630. Once the configuration is retrieved, host 605 and configuration module 607 may configure containers on the host based on the configuration.

As described previously, in at least one implementation, the configuration obtained for host 605 may include the images of the containers and an addressing configuration for the containers. Thus, when the configuration is received, host 605 may generate the required containers based on the provided container images and allocate a virtual network interface to each of the containers based on the addressing configuration. These virtual network interfaces may be provided as TAP interfaces from host 605, and be used to ensure that each of the containers only communicates over a desired virtual private network.

In other implementations, the configuration received may not include images for the containers. Rather, the addressing configuration may be used to configure container images already available on the host. Thus, once the addressing configuration is received, configuration module 607 may allocate virtual network interfaces or TAP interfaces to each of the containers based on the provided configuration.

Figure 7:
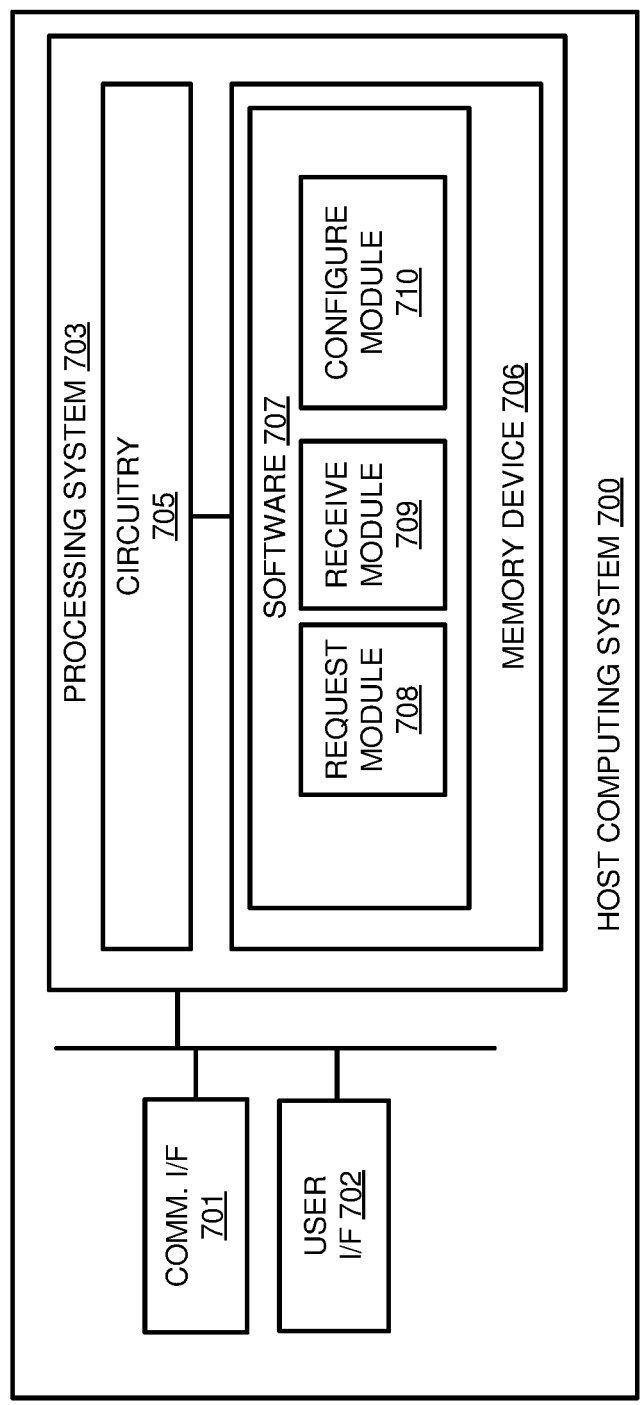
FIG. 7 illustrates a host computing system according to one implementation.

FIG. 7 illustrates a host computing system 700 according to one implementation. Computing system 700 is representative of any computing system or systems with which the various operational architectures, processes, scenarios, and sequences disclosed herein for generating address mapping may be implemented. Computing system 700 is an example of computing system 105 and 605, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity. Computing system 700 may comprise a server, a user device, a desktop computer, a laptop computer, a tablet computing device, or some other user communication apparatus.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In some implementations, communication interface 701 is used to communicate with one or more configuration network resources, to retrieve configurations for one or more containers to be executed on host computing system 700. Further, in some implementations, communication interface 701 may be configured to communicate with an authentication server that is used to provide access credentials to host computing system 700 based on user identifier information and/or host system identifier information. These access credentials may include addressing information for the configuration resource, encryption information for the configuration resource, security handshake information for the configuration resource, or some other access information.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes request module 708, receive module 709, and configure module 710, although any number of software modules within the application may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In at least one implementation, request module 708, when read and executed by processing system 703, directs processing system 703 to transfer a request to at least one configuration resource to obtain an addressing configuration for one or more containers to be executed on the host. Once the request is transferred, receive module 709 directs processing system 703 to receive at least an addressing configuration for the one or more containers to be executed on the host. In response to receiving the addressing configuration, configure module 710 directs processing system 703 to assign a virtual network interface to each of the one or more containers based on the received addressing configuration. This assignment of the virtual network interfaces may include assigning TAP interfaces, wherein each of the TAP interfaces is associated with a virtual network corresponding to the container.

In some examples, prior to requesting the configurations from the at least one configuration resource, request module 708 may transfer user identifier information and/or device identifier information to an authentication server. This authentication server may be used to determine which of the configuration resources should be made available to the host, wherein different configuration resources may be allocated to different users and/or different computing systems. Once at least one configuration resource is identified for host computing system 700, access credentials are returned to the host permitting the host to access the one or more configuration resources.

In some implementations, the configuration resources may be used to supply the host computing system with images for the containers, as well as the addressing configuration for the containers. Thus, once the configuration is received, the images may be used to generate the required containers, and the addressing configuration may be used to supply the containers with a virtual network interface. In other implementations, host computing system 700 may be pre-supplied with the required container images. As a result, when the addressing configuration is retrieved from the at least one resource, the addressing configuration may be used to allocate the virtual network interface to the container images.

In addition to the operations described herein regarding the configuration of containers for host systems, in some implementations, computing systems, such as computing system 700 may use Network Address Translation (NAT) functionality to transparently redirect connections on underlay networks to overlay networks based on centrally configured policies. The NAT functionality is built into most modern operating systems and requires no additional software to be installed on client or server machines.

In one implementation, a service is configured to only listen on overlay but all clients are pre-configured to reach server on underlay, but it is difficult to change configuration on all the clients. The solution is to use destination NAT (DNAT) on the client machines to alter the destination address from an underlay address to corresponding overlay address. This transparently redirects client initiated connections to egress on overlay, without any changes to the clients.

In another implementation, a service is configured to only listen on underlay, but it may be difficult to listen on overlay. A solution is to use DNAT on the server machine to locally forward packets received on overlay to a configured underlay interface.

In absence of NAT functionality one can use built-in packet processing frameworks on some operating systems to realize the same outcome with a similar level of transparency.

This transparent programming of NAT is made possible with a central server, such as the configuration resources described herein, that manages the machines and virtual networks and is aware of the mappings between underlay and overlay address space. Thus, similar to the operations described above with regard to retrieving the configuration of the host to allocate interfaces to containers, computing systems, either real or virtual, may communicate with a managing server to configure the local NAT of the computing system.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer-implemented system for allocating virtual network interfaces to each of a plurality of containers hosted on a host computing system, said computer-implemented system comprising:
   a memory module storing computer program code for allocating said virtual network interfaces to each of said containers hosted on said host computing system;
   a processor communicably coupled to said memory module, said processor configured to executed said computer program code stored within said memory module, said processor, on execution of said computer program code, configured to trigger said host computing system to:
   transmit a request to a remote configuration resource;
   trigger said remote configuration resource, by way of said request, to return-transmit an addressing configuration necessary for configuring at least one predetermined container hosted on said host computing system, and wherein said addressing configuration includes at least a software image pre-configured to transform said predetermined container into a pre-specified service node, and wherein said software image includes at least files and repositories necessary for execution of said predetermined container on said host computing system, and wherein software image triggers said predetermined container to share at least kernel resources provided by an operating system executed on said host computing system, with other containers, despite said container and said other containers pre-configured with private access to said operating system within corresponding identifiers spaces, file system structures, and network interfaces; and
   wherein said processor further triggers said host computing system to assign a virtual network interface to said predetermined container based on said addressing configuration, wherein said virtual network interface is pre-configured to connect said predetermined container to a pre-designated virtual private network (VPN), thereby confining inbound and outbound communications of said predetermined container to said pre-designated virtual private network and to devices connected to said virtual private network, and thereby preventing said predetermined container and said inbound and outbound communications from being visible and identifiable beyond said pre-designated virtual private network, and wherein assignment of said virtual network interface to said predetermined container enhances security attributed to said predetermined container, since said predetermined container is connected only to a network associated with said virtual private network.

2. The system as claimed in claim 1, wherein the processor triggers the host computing system to transmit predetermined credentials to said remote configuration resource for receiving said addressing configuration therefrom, said processor further configured to trigger said remote configuration resource to receive and process said credentials, and determine, based on said credentials, whether said host computing system is eligible to receive said addressing configuration.

3. The system as claimed in claim 2, wherein said host computing system is configured to selectively request and receive said predetermined credentials from an authentication server, as a response to transmission of predetermined host identifier information identifying said host computing system, to said authentication server.

4. The system as claimed in claim 1, wherein said processor is further configured to trigger said host computing system to assign a TAP interface to said predetermined container based on said addressing configuration, and wherein said TAP interface is configured to establish an Ethernet bridge from said predetermined container to said devices connected to said virtual private network.

5. The system as claimed in claim 1, wherein said addressing configuration corresponding to said predetermined container, return-transmitted by said remote configuration resource onto said host computing system includes information identifying at least said virtual private network and said devices connected to said virtual private network.

6. The system as claimed in claim 1, wherein said processor triggers said host computing system to assign respective virtual network interfaces to each of said plurality of containers hosted therein, such that each of said virtual network interfaces connects a corresponding container to a predetermined, disparate virtual private network, thereby separating each of said containers and said inbound and outbound communications, based on said virtual private network connected to each of said containers.

7. A computer-implemented method, executable on a computer processor, for allocating virtual network interfaces to each of a plurality of containers hosted on a host computing system, said computer-implemented method comprising the following steps:
   triggering, by said processor, said host computing system to transmit a request to a remote configuration resource for addressing configuration corresponding to at least one predetermined container;
   triggering, by said processor, said remote configuration resource to return-transmit, in response to said request, an addressing configuration necessary for configuring said at least one predetermined container, and wherein said addressing configuration includes at least software image pre-configured to transform said predetermined container into a pre-specified service node, and wherein said software image includes at least files and repositories necessary for execution of said predetermined container on said host computing system, and wherein software image triggers said predetermined container to share at least kernel resources provided by an operating system executed on said host computing system, with other containers, despite said container and said other containers pre-configured with private access to said operating system within corresponding identifiers spaces, file system structures, and network interfaces; and triggering, by said processor, said host computing system to assign a virtual network interface to said predetermined container based on said addressing configuration, wherein said virtual network interface is configured to connect said predetermined container to a pre-designated virtual private network (VPN), thereby confining inbound and outbound communications of said predetermined container to said pre-designated virtual private network and to devices connected to said virtual private network, and thereby preventing said predetermined container and said inbound and outbound communications from being visible and identifiable beyond said pre-designated virtual private network, and thereby enhancing security attributed to said predetermined container, since said predetermined container is connected only to a network associated with said virtual private network.

8. The method as claimed in claim 7, wherein the method further includes the steps of:

triggering, by said processor, said host computing system to transmit predetermined credentials to said remote configuration resource for receiving said addressing configuration therefrom;

triggering, by said processor, said remote configuration resource to receive and process said credentials, and determine, based on said credentials, whether said host computing system is eligible to receive said addressing configuration.

9. The method as claimed in claim 8, wherein the method further includes the step of triggering said host computing system, by said processor, to selectively request and receive said predetermined credentials from an authentication server, as a response to transmission of predetermined host identifier information identifying said host computing system, to said authentication server.

10. The method as claimed in claim 7, wherein the method further includes the step of triggering, by said processor, said host computing system to assign a TAP interface to said predetermined container based on said addressing configuration, and configuring, by said processor, said TAP interface to establish an Ethernet bridge from said predetermined container to said devices connected to said virtual private network.

11. The method as claimed in claim 7, wherein the method further includes the step of triggering, by said processor, said host computing system to assign respective virtual network interfaces to each of said plurality of containers hosted therein, such that each of said virtual network interfaces connects a corresponding container to a predetermined, disparate virtual private network, thereby separating each of said containers and said inbound and outbound communications, based on said virtual private network connected to each of said containers.

12. A non-transitory computer-readable storage medium having computer executable instructions stored thereupon, said computer executable instructions, when executed by a computer processor, cause the processor to:

trigger said host computing system to transmit a request to a remote configuration resource for addressing configuration corresponding to at least one predetermined container;

trigger said remote configuration resource to return-transmit, in response to said request, an addressing configuration necessary for configuring said at least one predetermined container, and wherein said addressing configuration includes at least a software image pre-configured to transform said predetermined container into a pre-specified service node, and wherein said software image includes at least files and repositories necessary for execution of said predetermined container on said host computing system, and wherein software image triggers said predetermined container to share at least kernel resources provided by an operating system executed on said host computing system, with other containers, despite said container and said other containers pre-configured with private access to said operating system within corresponding identifiers spaces, file system structures, and network interfaces; and trigger said host computing system to assign a virtual network interface to said predetermined container based on said addressing configuration, wherein said virtual network interface is configured to connect said predetermined container to a pre-designated virtual private network (VPN), thereby confining inbound and outbound communications of said predetermined container to said pre-designated virtual private network and to devices connected to said virtual private network, and thereby preventing said predetermined container and said inbound and outbound communications from being visible and identifiable beyond said pre-designated virtual private network, and thereby enhancing security attributed to said predetermined container, since said predetermined container is connected only to a network associated with said virtual private network.

13. The non-transitory computer-readable storage medium as claimed in claim 12, wherein the computer executable instructions stored upon the non-transitory computer-readable storage medium, further cause the processor to:

trigger said host computing system to transmit predetermined credentials to said remote configuration resource for receiving said addressing configuration therefrom;

trigger said remote configuration resource to receive and process said credentials, and to determine, based on said credentials, whether said host computing system is eligible to receive said addressing configuration;

trigger said host computing system to selectively request and receive said predetermined credentials from an authentication server, as a response to transmission of predetermined host identifier information identifying said host computing system, to said authentication server;

trigger said host computing system to assign a TAP interface to said predetermined container based on said addressing configuration, and configuring, by said processor, said TAP interface to establish an Ethernet bridge from said predetermined container to said devices connected to said virtual private network; and trigger said host computing system to assign respective virtual network interfaces to each of said plurality of containers hosted therein, such that each of said virtual network interfaces connects a corresponding container to a predetermined, disparate virtual private network, thereby separating each of said containers and said inbound and outbound communications, based on said virtual private network connected to each of said containers.

* * * * *